(12) United States Patent
Manakame et al.

(10) Patent No.: US 12,212,566 B2
(45) Date of Patent: Jan. 28, 2025

(54) SECURE EXECUTION OF MICROSERVICES

(71) Applicant: Dell Products L.P., Round Rock, TX (US)

(72) Inventors: Teja Madhukar Manakame, Bangalore (IN); Shibi Panikkar, Bangalore (IN); Jennifer Ann Felch, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 18/077,753

(22) Filed: Dec. 8, 2022

(65) Prior Publication Data

US 2024/0195809 A1 Jun. 13, 2024

(51) Int. Cl.
*H04L 9/40* (2022.01)
*G06F 9/54* (2006.01)

(52) U.S. Cl.
CPC .......... *H04L 63/0884* (2013.01); *G06F 9/547* (2013.01); *H04L 63/10* (2013.01)

(58) Field of Classification Search
None
See application file for complete search history.

(56) References Cited

U.S. PATENT DOCUMENTS

| | | | | |
|---|---|---|---|---|
| 10,983,850 B1 * | 4/2021 | Kwan | ................ | G06F 11/0793 |
| 2022/0350642 A1 * | 11/2022 | Poddar | ................ | G06F 11/2097 |

OTHER PUBLICATIONS

English machine translation of Dou, "Service Selection Method Based On Quality Dependence Relation Under Service Combination Environment" (CN 101325601A), Dec. 17, 2008, pp. 1-7 (Year: 2008).*
English machine translation of Motoki et al., "Cluster System and Service Control Program" (JP 2005011237A), Jan. 13, 2005, pp. 1-29 (Year: 2005).*
Power, Timothy, "Access token security for microservice APIs on Amazon EKS", AWS Security Blog, available at: https://aws.amazon.com/blogs/security/access-token-security-for-microservice-apis-on-amazon-eks/ (last accessed Dec. 8, 2022), published Aug. 19, 2021.
"8 Ways to Secure Your Microservices Architecture", Okta Inc., available at: https://www.okta.com/sites/default/files/pdf/Okta_Whitepaper_8_Ways_to_Secure_Your_Microservices_Architecture.pdf (last accessed Dec. 8, 2022), published.

* cited by examiner

*Primary Examiner* — Clayton R Williams
(74) *Attorney, Agent, or Firm* — Ryan, Mason & Lewis, LLP (57) ABSTRACT

Methods, apparatus, and processor-readable storage media for securely executing microservices are described herein. An example computer-implemented method includes: generating a session identifier for a request associated with executing one or more microservices in a microservice architecture; identifying an execution plan for the request based at least in part on a plan identifier specified for a first one of the microservices, wherein the execution plan indicates a specified order for executing the microservices for the request; maintaining a set of chained data structures to track an execution order of the microservices based on the session identifier; detecting, based at least in part on the set of chained data structures, that the execution order of the identified execution plan does not match the specified order for at least a given one of the of the one or more microservices; and in response to the detecting, preventing at least the given microservice from being executed.

20 Claims, 8 Drawing Sheets

SECURE EXECUTION OF MICROSERVICES

FIELD

The field relates generally to information processing systems, and more particularly to microservices associated with such systems.

BACKGROUND

Microservice architectures often include an application programming interface (API) gateway that provides access to microservices via one or more APIs. It may be difficult with existing techniques to secure such microservice architectures as each microservice provides an endpoint for the access.

SUMMARY

Illustrative embodiments of the disclosure relate to techniques for securely executing microservices. An exemplary computer-implemented method includes generating a session identifier for a request associated with executing one or more microservices in a microservice architecture; identifying an execution plan for the request based at least in part on a plan identifier specified for a first one of the one or more microservices, wherein the execution plan indicates a specified order for executing the one or more microservices for the request; maintaining a set of chained data structures to track an execution order of the one or more microservices based on the session identifier; detecting, based at least in part on the set of chained data structures, that the execution order of the identified execution plan does not match the specified order for at least a given one of the of the one or more microservices; and in response to the detecting, preventing at least the given one of the one or more microservices from being executed.

Illustrative embodiments can provide significant advantages relative to conventional security techniques for microservice architectures. For example, one or more technical challenges associated with securing microservice architectures are overcome in one or more embodiments by tracking and restricting the execution order of microservices according to one or more secure execution plans.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

A microservice architecture is a type of architecture that arranges an application as a collection of independent services that communicate using one or more APIs. Generally, each independent service is referred to as a "microservice," and can be built and deployed separately from the other microservices associated with the application. Microservices introduce many more entry points than a typical monolithic application, and each of these entry points are potentially vulnerable to software attacks. For example, a conventional monolithic application generally includes a single-entry point, whereas an application in a microservice architecture may include hundreds of entry points.

Some microservice architectures use an API gateway as an entry point for a request from a client application into a given system. The API gateway can also implement one or more authentication mechanisms to control access to components associated with the API gateway. The term "components" as used in this context and elsewhere herein is intended to be broadly construed so as to encompass, for example, executables, libraries, APIs to one or more other systems, containers (possibly corresponding to one or more executables), databases, webservices, file systems, message queues, and/or microservices.

The authentication mechanisms can include, for example, usernames and passwords, biometrics, and/or certificate-based security techniques. Some conventional security mechanisms also include using digital signatures for validating authenticity of software components in a server and implementing network security techniques (e.g., to ensure data is securely transported into a component or between components). Internal components following the API gateway often do not implement additional security measures beyond generic token access. If a user can obtain a service level token, then the user can directly access the internal components of the microservice architecture without having to authenticate via the API gateway. Accordingly, conventional security techniques may not be effective against accidental or intentional acts carried out by users (e.g., employees or agents) that have access to credentials and/or tokens.

Illustrative embodiments described herein can provide an additional layer of security that can help prevent users from directly accessing internal services and components.

Figure 1:
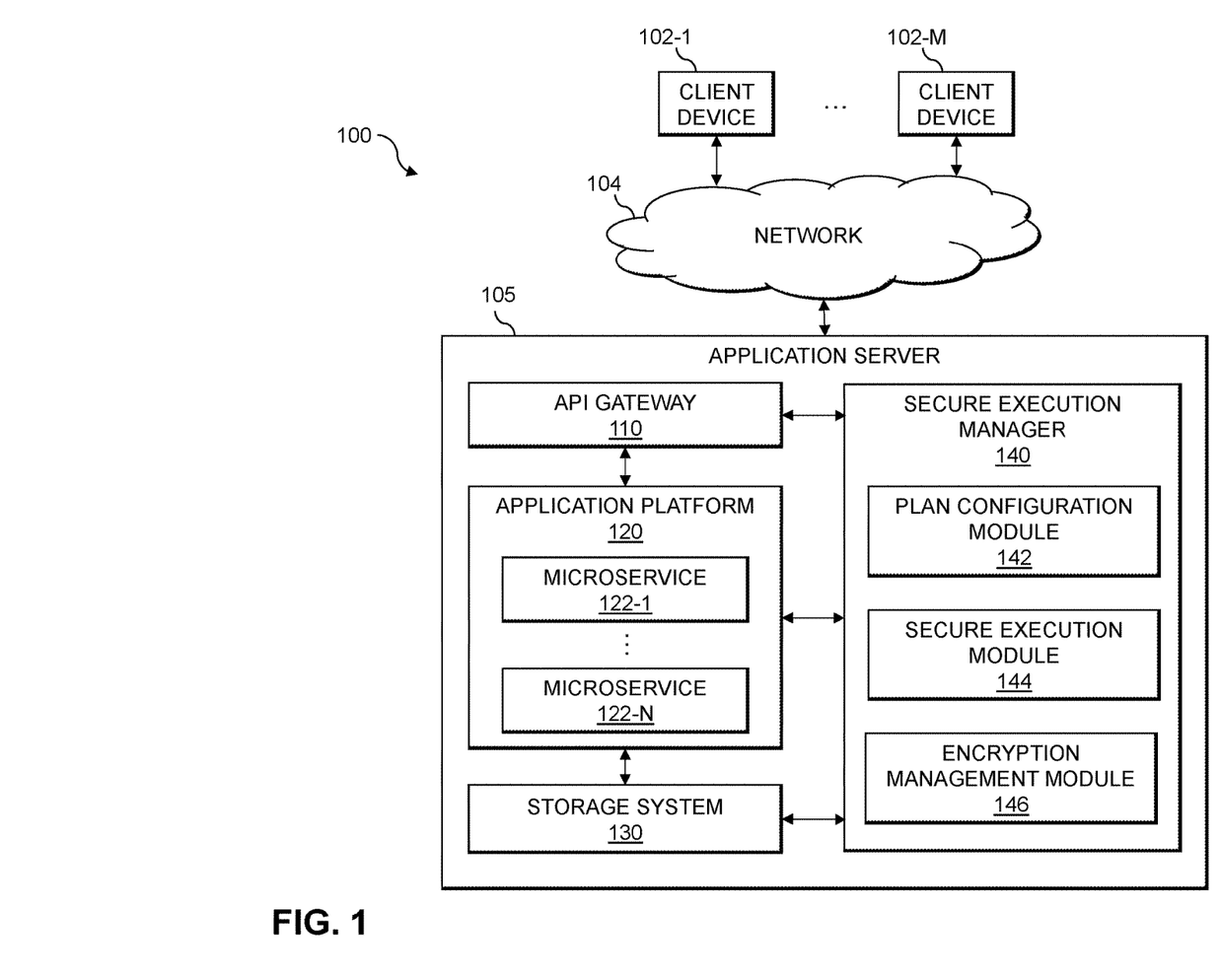
FIG. 1 shows an information processing system configured for secure execution of microservices in an illustrative embodiment.

FIG. 1 shows an information processing system configured for securely executing microservices in an illustrative embodiment. The information processing system 100 comprises client devices 102-1, ... 102-M (collectively "client devices 102"), a network 104, and an application server 105.

The client devices 102 can comprise, for example, Internet of Things (IOT) devices, desktop, laptop or tablet computers, mobile telephones, or other types of processing devices capable of communicating with the application server 105 over the network 104. Such devices are examples of what are more generally referred to herein as "processing devices." Some of these processing devices are also generally referred to herein as "computers." It is also to be appreciated that the term "client device" is intended to be broadly construed so as to also encompass, for example, a calling application and/or a calling service that is connected on a network (e.g., network 104). Also, it is to be understood that a given one of the client devices 102 can encompass a computer, where a user accesses or interacts with a calling application even if the calling application is not on the computer (e.g., the calling application could be on one or more computing platforms, including the same one that a requested microservice is executed on).

The client devices 102 may comprise respective computers associated with a particular company, organization or other enterprise. In addition, at least portions of the information processing system 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the terms "client" and "user" as described herein are intended to be broadly construed so as to encompass numerous arrangements of human, hardware, software or firmware entities, as well as combinations of such entities.

The client devices 102 can access the application server 105 over the network 104. The network 104 is assumed to comprise a portion of a global computer network such as the Internet, although other types of networks can be part of the information processing system 100, including a wide area network (WAN), a local area network (LAN), a satellite network, a telephone or cable network, a cellular network, a wireless network such as a Wi-Fi or WiMAX network, or various portions or combinations of these and other types of networks. The information processing system 100 in some embodiments therefore comprises combinations of multiple different types of networks, each comprising processing devices configured to communicate using internet protocol (IP) or other related communication protocols.

The application server 105 in the FIG. 1 embodiment is assumed to be implemented using at least one processing device. Each such processing device generally comprises at least one processor and an associated memory, and implements one or more functional modules for controlling certain features of the application server 105.

More particularly, the application server 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the application server 105 to communicate over the network 104 with the client devices 102, and illustratively comprises one or more conventional transceivers.

In the FIG. 1 example, the application server 105 further comprises an API gateway 110, an application platform 120, a storage system 130, and a secure execution manager 140. The application server 105 is configured to perform data processing, data storage, and data management functions to support one or more cloud-based or web-based applications or services and/or other types of applications that are implemented by the application platform 120. It is to be appreciated that at least a portion of the available services and functionalities provided by the application server 105 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

The application platform 120 of the application server 105 is assumed to implement at least a portion of a microservice architecture which includes a plurality of microservices 122-1, . . . 122-N (collectively, microservices 122) that are combined to provide a structured application. For example, the microservice architecture may implement an application as a collection of loosely-coupled services, wherein the services expose fine-grained APIs and lightweight protocols. Each microservice 122 can include a self-contained software module with associated functionality and interfaces. In some embodiments, the application platform 120 runs in a virtualized environment (e.g., virtual machines) or a containerized environment (e.g., containers) in which the number of instances of a given microservice and the locations (e.g., host and port) of such instances change dynamically.

In the microservices architecture, each microservice 122 (and instances thereof) exposes a set of fine-grained endpoints to access resources provided by the microservice. Each endpoint specifies a location from which APIs can access the resources needed to perform functions. Each microservice 122 can maintain its own database in the storage system 130 in order to be decoupled from other microservices. The microservice-based framework enables the individual microservices 122 to be deployed and scaled independently, to be developed and updated in parallel by different teams and in different programming languages, and to have their own continuous delivery and deployment stream. While the application platform 120 is generically depicted in FIG. 1, the application platform 120 can implement any suitable cloud-based application (e.g., multi-tenant SaaS application). For example, the application platform 120 can implement a cloud-based SaaS application that allows customers to monitor, analyze, and troubleshoot their storage systems, or any other type of SaaS application which comprises hundreds or thousands of microservices and associated endpoints.

The storage system 130, in at least some embodiments, can be implemented using any of a variety of different types of storage including network-attached storage (NAS), storage area networks (SANs), direct-attached storage (DAS)

and distributed DAS, as well as combinations of these and other storage types, including software-defined storage. For example, the storage system 130 can include a plurality of storage nodes comprising storage appliances with memory controllers, processors, cache memory, and non-volatile storage media to provide persistent storage resources (e.g., file repositories, databases, etc.) for the application platform 120 and/or other components or systems associated with the application server 105.

The API gateway 110 implements methods that are configured to enable client applications to access the services of the application platform 120. In particular, the API gateway 110 provides a single-entry point for client applications to issue API requests for services that are provided by the application platform 120. The API gateway 110 abstracts the client applications from knowing how the application platform 120 is partitioned into microservices, and from having to determine the locations of service instances. The API gateway 110 comprises logic for calling one or more of the microservices 122 in response to a client request. The API gateway 110 communicates with client applications and the microservices 122 using any suitable API framework. For example, in some embodiments, the API gateway 110 and the microservices 122 implement a REST API. In other embodiments, the API gateway 110 and the microservices 122 implement a SOAP API.

In at least some embodiments, a login portal can be associated with the API gateway 110 to allow client applications running on client devices (e.g., client devices 102) to access the individual microservices 122 of the application platform 120. In such an example, the login portal can include a user interface which implements methods that allow a user to connect to the application server 105 (via a client device 102) and log in to the application server 105 and provide credentials for a user authentication/verification process. In some embodiments, the login portal comprises different user interfaces to support connectivity with different types of devices (for example, mobile devices, desktop computers, servers, etc.) and different types of HTML-based browsers.

In some embodiments, the API gateway 110 is implemented using a single gateway service that is configured to interface with many different types of client applications (e.g., web-based applications, mobile applications, etc.). In other embodiments, the API gateway 110 comprises a plurality of gateway services, each configured to interface with a different type of client application. In all instances, the API gateway 110 performs various functions. For example, the API gateway 110 functions as a reverse proxy to redirect or route requests from client applications to target endpoints of the microservices 122. In this instance, the API gateway 110 provides a single endpoint or Uniform Resource Locator (URL) to receive requests from client applications for access to services of the application platform 120, and internally maps client requests to one or more of the microservices 122.

Furthermore, the API gateway 110 can implement aggregation services to aggregate multiple client requests (e.g., HTTP requests) which target multiple microservices 122 into a single request. In this instance, a client application may send a single request to the API gateway 110 to perform a single task, and the API gateway 110 dispatches multiple calls to different backend microservices 122 to execute the task. The API gateway 110 aggregates the results from the multiple microservices and sends the aggregated results to the client application. In this instance, the client application issues a single request and receives a single response from the API gateway 110 despite that the single request is parsed and processed by multiple microservices 122. The API gateway 110 can be configured to implement other functions or microservices to implement authentication and authorization, service discovery, response caching, load balancing, etc.

In the example shown in FIG. 1, the secure execution manager 140 includes a plan configuration module 142, a secure execution module 144, and an encryption management module 146. Generally, the plan configuration module 142 is configured to track and manage the order in which the microservices 122 are executed based on a set of valid execution plans configured by the plan configuration module 142. By way of example, the plan configuration module 142 can provide a user interface to enable execution plans to be configured and registered with the secure execution manager 140. A given execution plan, in some embodiments, includes information that defines one or more authorized execution sequences for at least some of the microservices 122. The secure execution module 144 verifies that the execution orders associated with client requests conform to at least one of the authorized execution sequences. If the secure execution module 144 detects that the execution order of a given client request does not correspond to a registered execution plan, then the secure execution module 144 can deny access to the microservices for that request. Additionally, in at least some embodiments, the encryption management module 146 signs a given execution plan with a private key and publishes a corresponding public key to the microservices and/or components involved in that execution plan. The private key and public key can be used to track and monitor the execution order of the client requests (e.g., using a pseudo block chain implementation) as described in more detail elsewhere herein.

It is to be appreciated that this particular arrangement of API gateway 110, the application platform 120, the storage system 130, the secure execution manager 140, the plan configuration module 142, the secure execution module 144, and the encryption management module 146 illustrated in the application server 105 of the FIG. 1 embodiment is presented by way of example only, and alternative arrangements can be used in other embodiments. For example, the functionality associated with the elements 110, 120, 130, 140, 142, 144, and/or 146, or portions thereof, in other embodiments can be combined into a single module, or separated across a larger number of modules. As another example, multiple distinct processors can be used to implement different ones of the elements 110, 120, 130, 140, 142, 144, and/or 146 or portions thereof.

At least portions of elements 110, 120, 130, 140, 142, 144, and/or 146 may be implemented at least in part in the form of software that is stored in memory and executed by a processor.

It is to be understood that the particular set of elements shown in FIG. 1 for application server 105 involving client devices 102 of information processing system 100 is presented by way of illustrative example only, and in other embodiments additional or alternative elements may be used. Thus, another embodiment includes additional or alternative systems, devices and other network entities, as well as different arrangements of modules and other components. As a non-limiting example, in at least one embodiment, the API gateway 110, the application platform 120, the storage system 130, the plan configuration module 142, the secure execution module 144, and/or the encryption management module 146 may be implemented on one or more other processing platforms that are accessible to the application server 105 over one or more networks. Such components can each be implemented at least in part within another system element or at least in part utilizing one or more stand-alone components coupled to the network 104.

An exemplary process utilizing elements 142, 144, and 146 of an example application server 105 in information processing system 100 will be described in more detail with reference to, for example, the flow diagram of FIG. 6.

Figure 2:
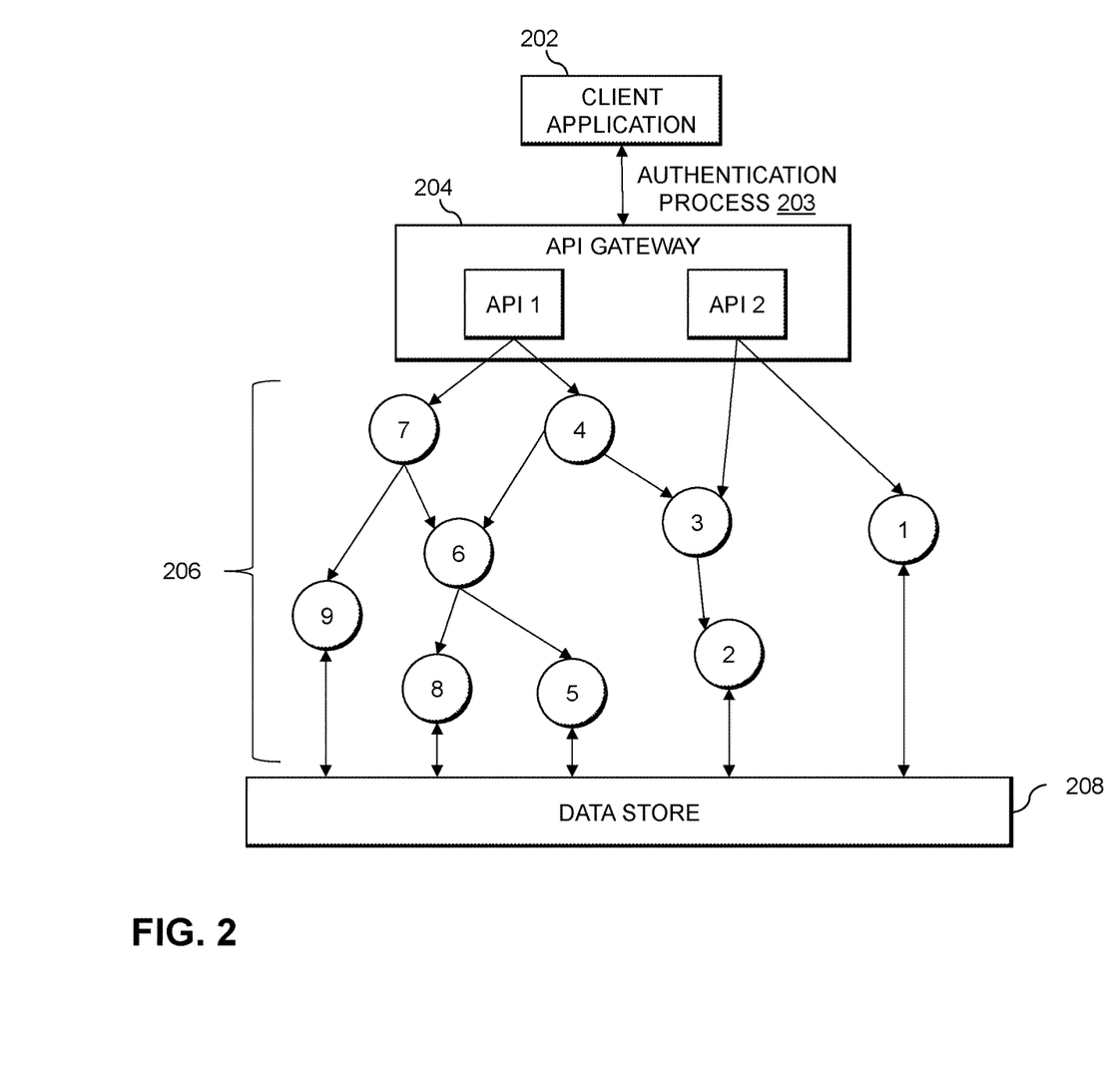
FIG. 2 shows an example of a microservice architecture in an illustrative embodiment.

FIG. 2 shows an example of a microservice architecture in an illustrative embodiment. The microservice architecture includes an API gateway 204 (e.g., API gateway 110), a plurality of internal service nodes 206 (labeled as nodes 1-9), and a data store 208 (e.g., corresponding to storage system 130). The API gateway 204 provides an entry point for two APIs (API 1 and API 2). A client application 202 (e.g., associated with one or more of the client devices 102) can gain access to the microservice architecture by performing an authentication process 203 with the API gateway 204. The authentication process 203 may be based on an authentication protocol (such as OAuth) and/or utilize client certificate-based security, as non-limiting examples. By way of example, the data store 208 may include details related to various customer orders, and API 2 could correspond to an API for reading order details for a particular order using a read order data service (e.g., corresponding to node 1). If API 2 gains access to node 1 using a generic service level token and a user can access the service level token, then the user can directly access node 1 without performing the authentication process.

Figure 3:
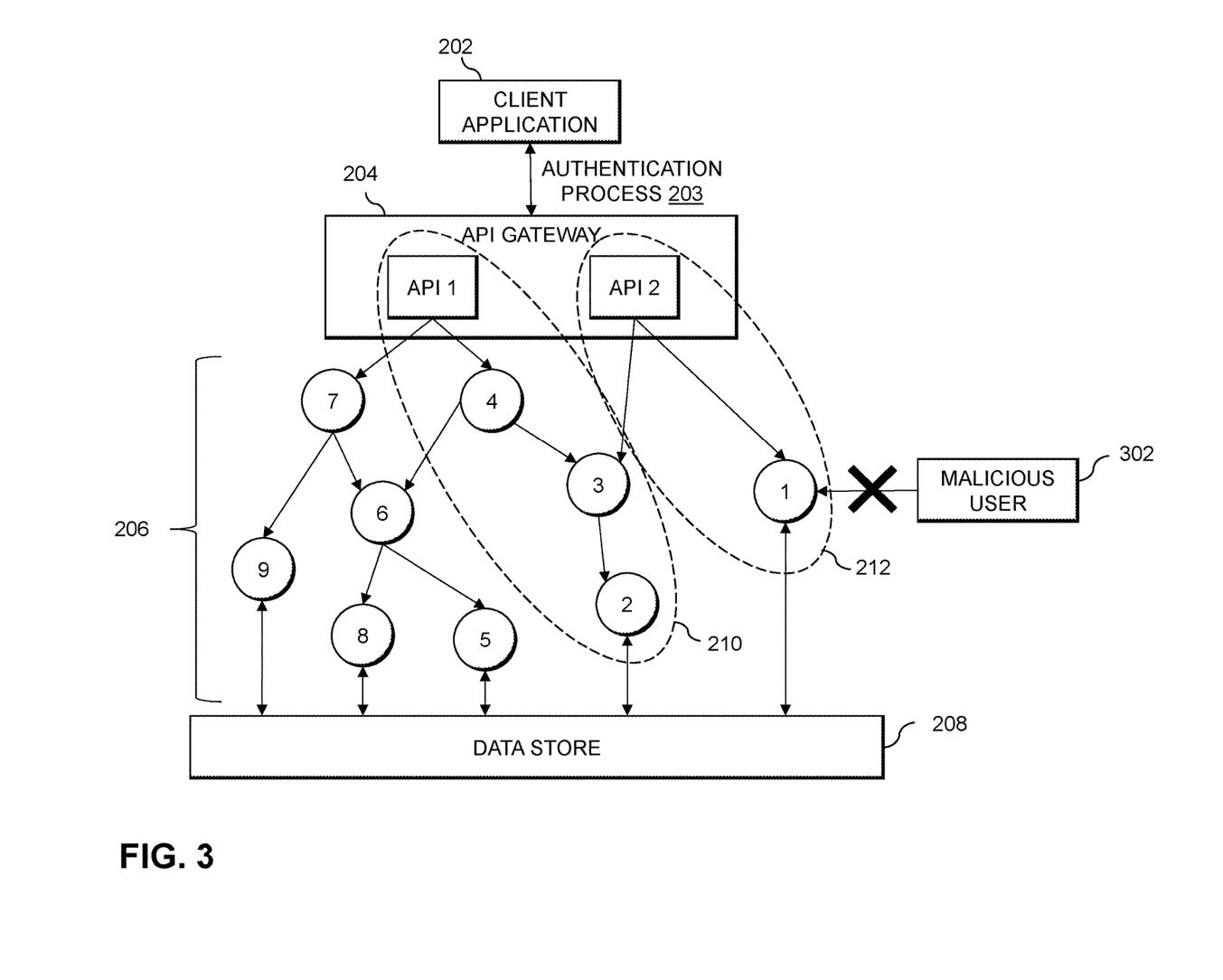
FIG. 3 shows an example of a microservice architecture having secure execution plans in an illustrative embodiment.

Referring also to FIG. 3, this figure shows an example of the microservice architecture from FIG. 2 having secure execution plans 210 and 212 in an illustrative embodiment. The secure execution plans 210 and 212 specify execution orders of APIs and internal service nodes 206 for a given session associated with a user request. In the FIG. 3 example, the execution order specified for secure execution plan 210 is: API 1→node 4→node 3→node 2, and the execution order specified for secure execution plan 212 is: API 2→node 1. Also shown in FIG. 3 is a malicious user 302 that attempts to directly access node 1. One or more embodiments check whether predecessor APIs and services associated with the user request have been executed and handed over in the same order as one of the secure execution plans 210 and 212. In the FIG. 3 example, the attempt by the malicious user 302 to access node 1 is blocked (as indicated by the bold "x"), as the access attempt does not match one of the secure execution plans 210 and 212.

Figure 4:
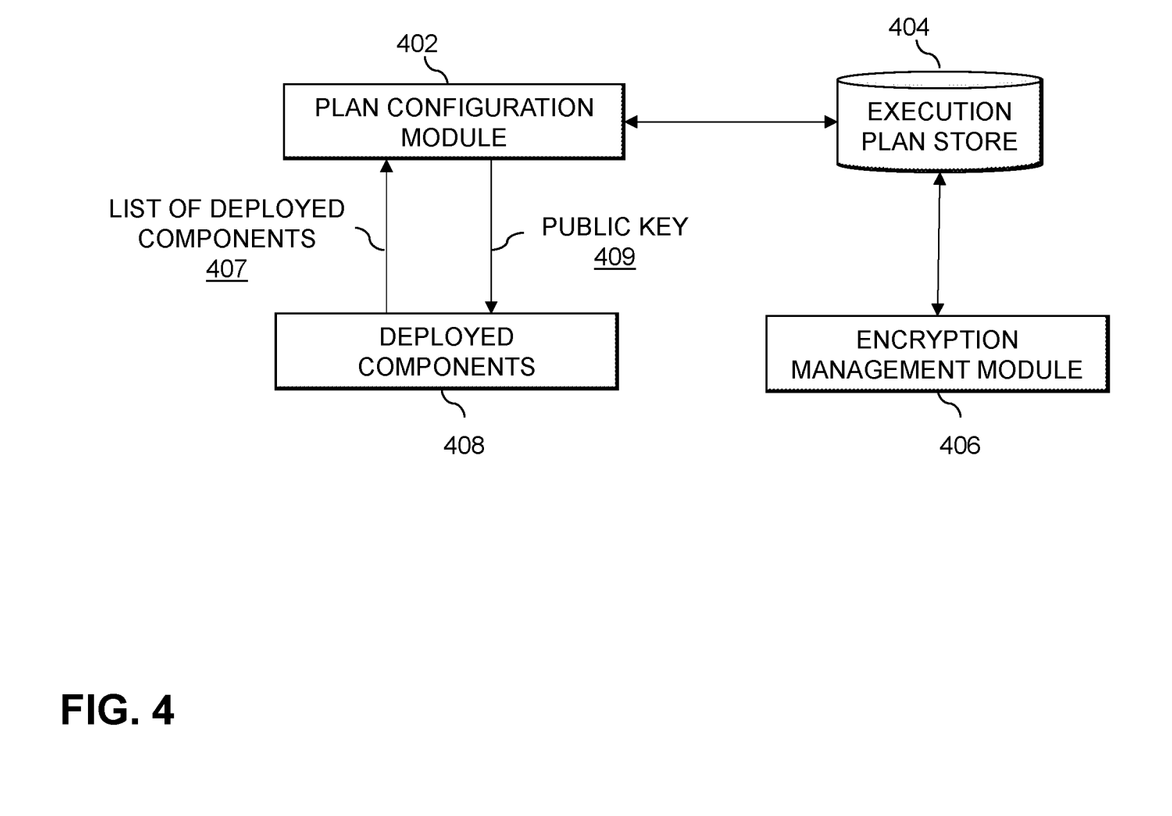
FIG. 4 shows a flow diagram for registering and storing secure execution plans in an illustrative embodiment.

FIG. 4 shows a schematic diagram for registering and storing secure execution plans in an illustrative embodiment. FIG. 4 includes a plan configuration module 402 (e.g., corresponding to plan configuration module 142), an execution plan store 404, an encryption management module 406 (e.g., corresponding to encryption management module 146), and a set of deployed components 408. The set of deployed components 408 comprise, for example, APIs and/or microservices (e.g., corresponding to API gateway 110 and/or application platform 120). At least some of the set of deployed components 408 can correspond to software images that are signed as trusted using a registration tool (such as Harbor).

In some embodiments, an administrator user can log in to the plan configuration module 402 to create one or more secure execution plans for the set of deployed components 408 via a user interface. In such embodiments, the plan configuration module 402 can obtain a list of the deployed components 407 and provide the list to the administrator user. The administrator user can generate, via the user interface, one or more secure execution plans based on the list of deployed components 407. The one or more secure execution plans created by the user are each associated with a respective unique identifier. For a given one of the secure execution plans, the encryption management module 406 encrypts the secure execution plan with a private key and also creates a corresponding public key. The encrypted secure execution plans are stored in the execution plan store 404.

The plan configuration module 402 obtains the public keys and the unique identifiers created for the encrypted secure execution plans. For a given one of the encrypted execution plans, the plan configuration module 402 publishes the corresponding public key 409 to the deployed components 408 that are identified by the encrypted execution plan. In at least one embodiment, a given one of the deployed components 408 can store the public key 409 at a software method level. In some embodiments, an overloaded method can be implemented so that multiple components can be called depending on the input (for example, in FIG. 2, node 6 can call node 8 or node 5). In one or more embodiments, the public key 409 is accessible to an auxiliary application (e.g., a sidecar application) associated with the component (as explained in more detail in conjunction with FIG. 5, for example). In at least some embodiments, the execution plan store 404 can be implemented as an immutable vault. In some embodiments, the execution plan store 404 is only accessible by the secure execution module 144. Additionally, in some embodiments, changes to a given one of the secure execution plans can require new private and public keys to be created.

Figure 5:
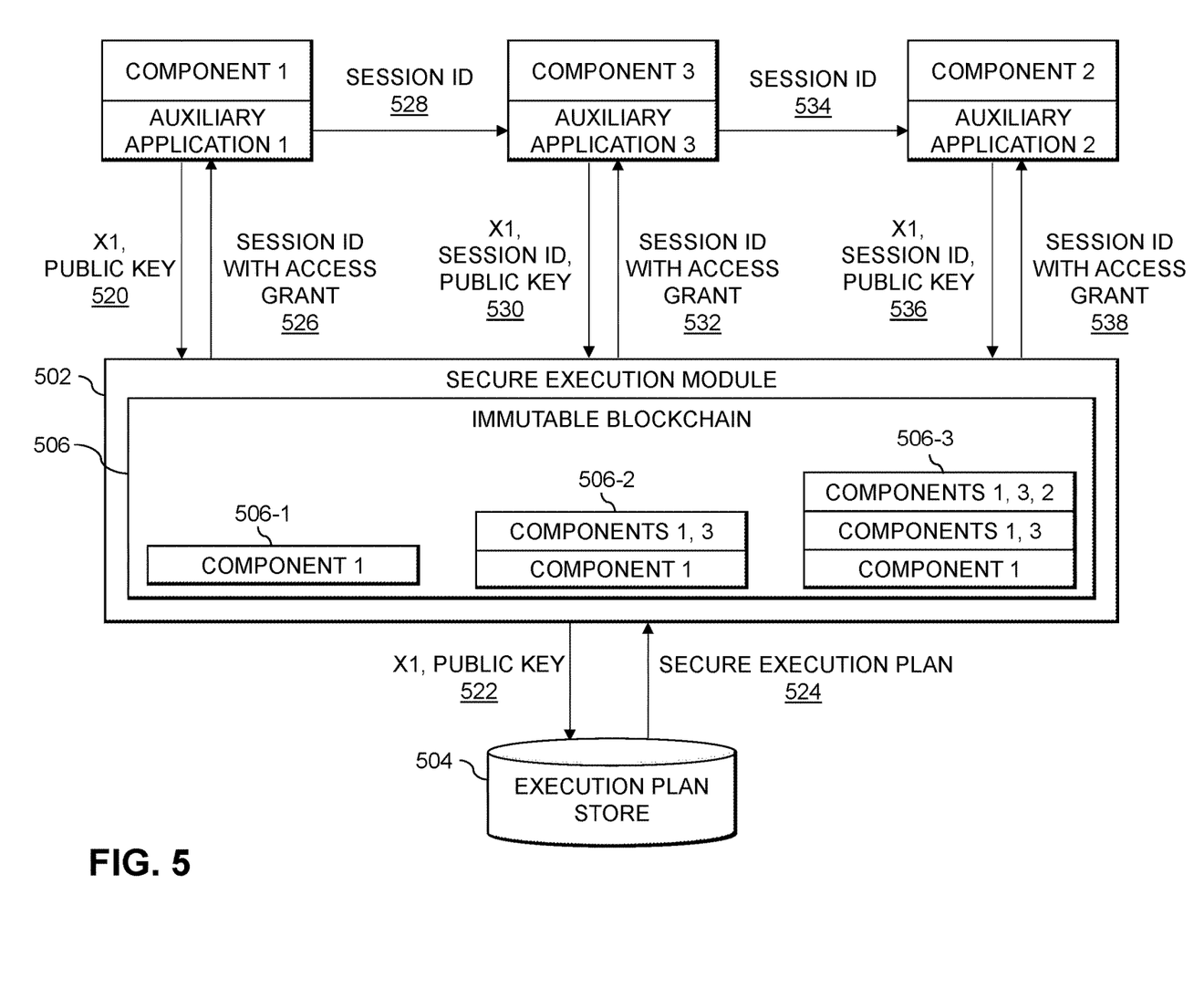
FIG. 5 shows a flow diagram for securely executing microservices using a blockchain-based implementation in an illustrative embodiment.

FIG. 5 shows a flow diagram for securely executing microservices using a blockchain-based implementation in an illustrative embodiment. FIG. 5 includes three components (labeled components 1-3) associated with auxiliary applications (labeled auxiliary applications 1-3). Also shown in FIG. 5 are a secure execution module 502 (e.g., corresponding to secure execution module 144) and an execution plan store 504 (e.g., corresponding to execution plan store 404).

In this embodiment, it is assumed that component 1 in FIG. 5 corresponds to an API associated with an API gateway (e.g., API gateway 110), and that a client request (e.g., from client device 102-1) has called component 1, and that client request has been properly authenticated and authorized based on an authentication process (such as authentication process 203). The auxiliary application 1 determines a unique identifier (X1) and a public key based on the client request. The unique identifier points to a secure execution plan that is stored in the execution plan store 504.

The auxiliary application 1 sends X1 and the public key to the secure execution module 502, as indicated by arrow 520. The secure execution module 502 sends a request comprising X1 and the public key to the execution plan store 504 as indicated by arrow 522 and retrieves a secure execution plan in response to the request, as indicated by arrow 524. More specifically, the secure execution module 502 obtains an encrypted secure execution plan for X1 and decrypts the secure execution plan using the public key. In this example, it is assumed that the secure execution plan indicates the following execution order: Component 1→Component 3→Component 2. It is noted that in some examples, two or more components (e.g., microservices) can execute in parallel. In such examples, the components that are executing in parallel can be grouped together so that they can be treated sequentially in the secure execution plan.

The secure execution module 502 generates a plan sequence identifier (session ID) associated with a session corresponding to the client request. The secure execution module 502 generates a first block 506-1 (also referred to as a genesis block) of an immutable blockchain 506 for the session ID. The block 506-1 indicates a current execution order for the session ID, which in this case includes component 1. The secure execution module 502 then sends the session ID with an access grant back to the auxiliary application 1, as indicated by arrow 526. The access grant allows component 1 to be executed. In some embodiments, the auxiliary application 1 can also send a notification indicating that component 1 has completed its process. The secure execution module 502 can then update block 506-1 to indicate the process has finished executing.

Auxiliary application 1 provides the session ID to auxiliary application 3, as indicated by arrow 528, and component 1 calls component 3. In this example, it is assumed component 3 is an internal service (e.g., a microservice). Component 3 sends X1, the session ID, and a public key to secure execution module 502, as indicated by arrow 530. In some embodiments, the public key was previously provided to the auxiliary application 3 as described in conjunction with FIG. 4, for example.

The secure execution module 502 checks the validity of the public key and confirms that the components executed for the session ID match the components identified in the secure execution plan for the public key. In response to determining that component 1 is a valid predecessor of component 3, the secure execution module 502 creates a second block 506-2, which indicates the execution order is now components 1 and 3. The second block 506-2 is chained to block 506-1. The secure execution module 502 then sends the session ID with an access grant back to auxiliary application 3, as indicated by arrow 532. The access grant allows component 3 to be executed. In a similar manner as described above, auxiliary application 3 can send a notification indicating that component 3 has completed its process. The secure execution module 502 can then update block 506-2 to indicate the process has finished executing.

The process continues in a similar manner with respect to component 3. Specifically, auxiliary application 3 provides the session ID to auxiliary application 2, as indicated by arrow 534, and component 3 calls component 2. Component 2 sends X1, the session ID, and a public key to secure execution module 502, as indicated by arrow 536. The secure execution module 502 checks the validity of the public key and confirms that the components executed for the session ID match the components identified in the secure execution plan for the public key. In this example, components 1 and 3 have been executed, which match the order specified by the secure execution plan. The secure execution module 502 creates a third block 506-3, which indicates the execution order is now components 1, 3, 2. The third block 506-3 is chained to blocks 506-1 and 506-2. The secure execution module 502 then sends the session ID with an access grant back to auxiliary application 2, as indicated by arrow 538. The access grant allows component 2 to be executed. In a similar manner as described above, auxiliary application 2 can send a notification indicating that component 2 has completed its process, and secure execution module 502 can update block 506-3 to indicate the process has finished executing.

In some embodiments, once the components in the secure execution plan have been successfully executed, the secure execution module 502 can remove the immutable blockchain 506 for the session ID (e.g., to free up storage space).

In other embodiments, the immutable blockchain 506 can be maintained for auditing purposes, for example.

Now consider a situation where a malicious user obtained the public key associated with component 2 in FIG. 5 as well as a session ID used for a previous client request. If the malicious user tries to directly access component 2 with the public key and the previous session ID, then the secure execution module 502 would recognize that the immutable blockchain 506 does not include authentic blocks. Therefore, the secure execution module 502 would not grant access to the component 2 to the malicious user.

Figure 6:
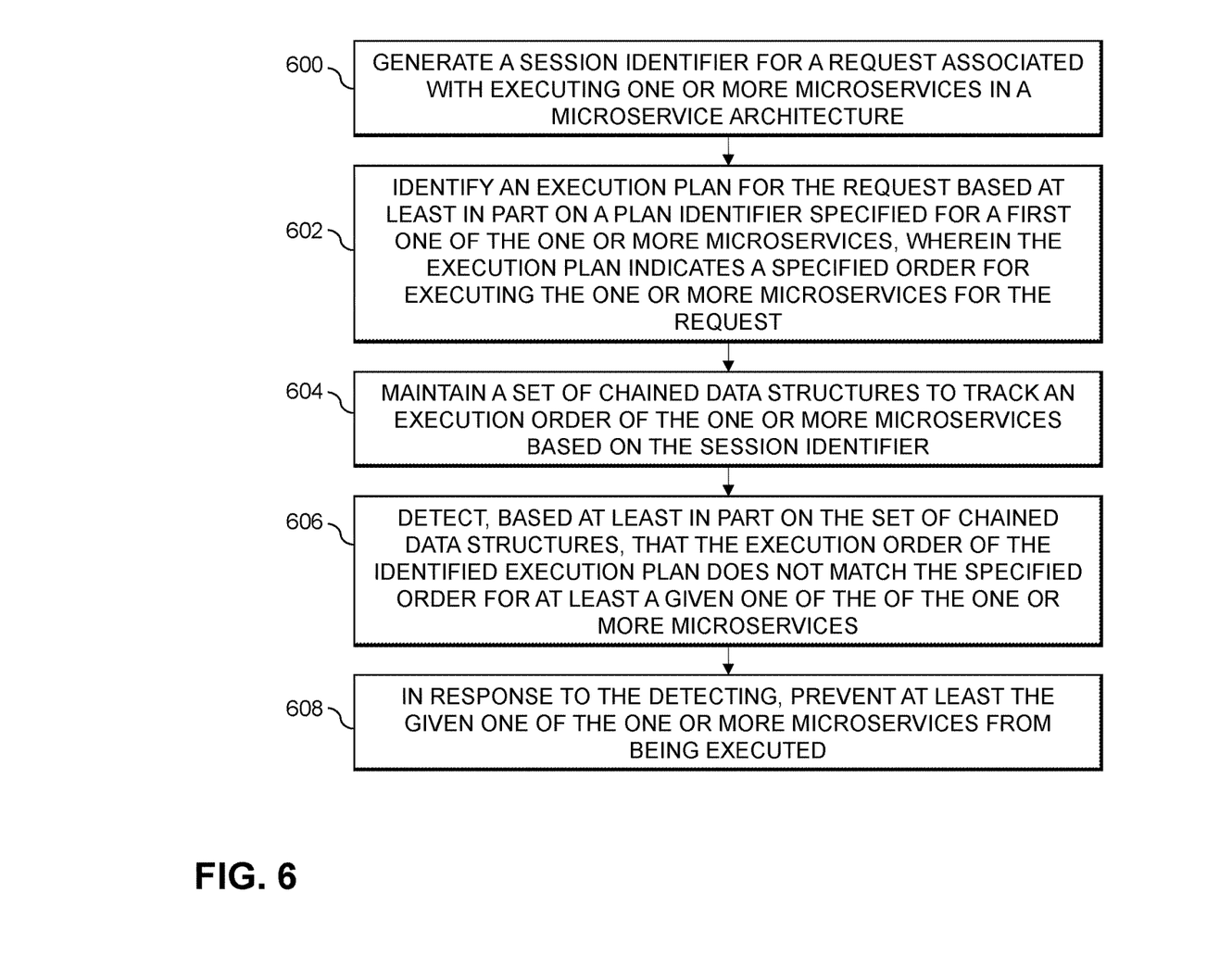
FIG. 6 shows a flow diagram of a process for securely executing microservices in an illustrative embodiment.

FIG. 6 is a flow diagram of a process for securely executing microservices in an illustrative embodiment. It is to be understood that this particular process is only an example, and additional or alternative processes can be carried out in other embodiments.

In this embodiment, the process includes steps 600 through 608. These steps are assumed to be performed by the application server 105 utilizing its 142, 144, and 146.

Step 600 includes generating a session identifier for a request associated with executing one or more microservices in a microservice architecture.

Step 602 includes identifying an execution plan for the request based at least in part on a plan identifier specified for a first one of the one or more microservices, wherein the execution plan indicates a specified order for executing the one or more microservices for the request.

Step 604 includes maintaining a set of chained data structures to track an execution order of the one or more microservices based on the session identifier.

Step 606 includes detecting, based at least in part on the set of chained data structures, that the execution order of the identified execution plan does not match the specified order for at least a given one of the of the one or more microservices.

Step 608 includes, in response to the detecting, preventing at least the given one of the one or more microservices from being executed.

The execution plan may be encrypted with a private key, and the identifying may include decrypting the execution plan with a public key associated with the one or more microservices. The public key and the plan identifier may be published to respective auxiliary applications associated with each microservice in the execution plan. A given one of the auxiliary applications may include a sidecar container. The session identifier may be sent from a first one of the auxiliary applications to a second one of the auxiliary applications in response to receiving a notification that the microservice associated with the first auxiliary application has completed. The execution plan may be stored in an immutable data store comprising a plurality of execution plans associated with the microservice architecture. The plurality of execution plans may be generated, via a user interface, by one or more administrator users. The request may be received at an application programming interface gateway. The application programming interface gateway may perform an authentication process to authenticate a user associated with the request. The process may further include a step of deleting the set of chained data structures in response to each of the one or more microservices being executed. The execution plan may further indicate a specified order for one or more components related to at least one of the one or more microservices.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to securely execute microservices by tracking client requests using a block-chain implementation and restricting access to microservices in accordance with one or more secure execution plans. These and other embodiments can significantly improve the security of microservice architectures by protecting against threats from malicious users attempting to access internal services even when the malicious users have obtained credentials or access tokens to such internal services.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
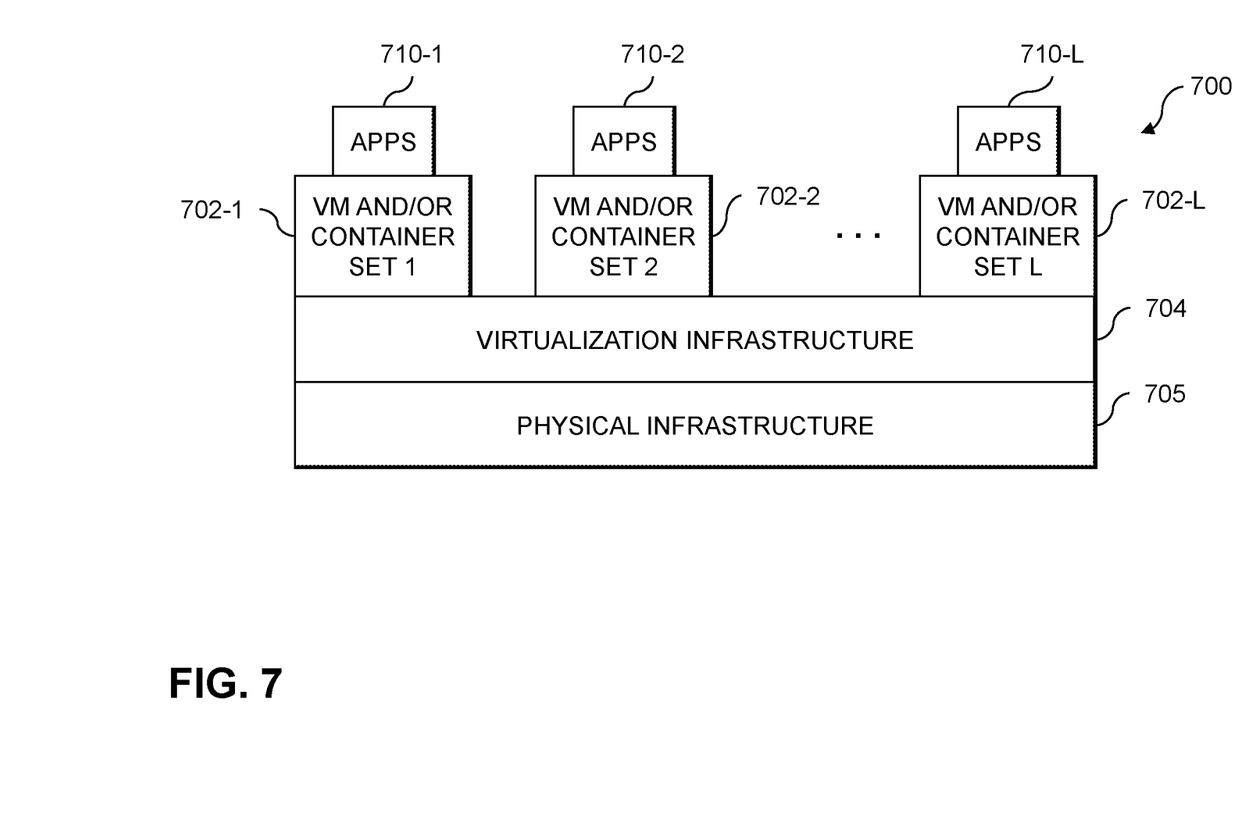
FIGS. 7 and 8 show examples of processing platforms that may be utilized to implement at least a portion of an information processing system in illustrative embodiments.
Figure 8:
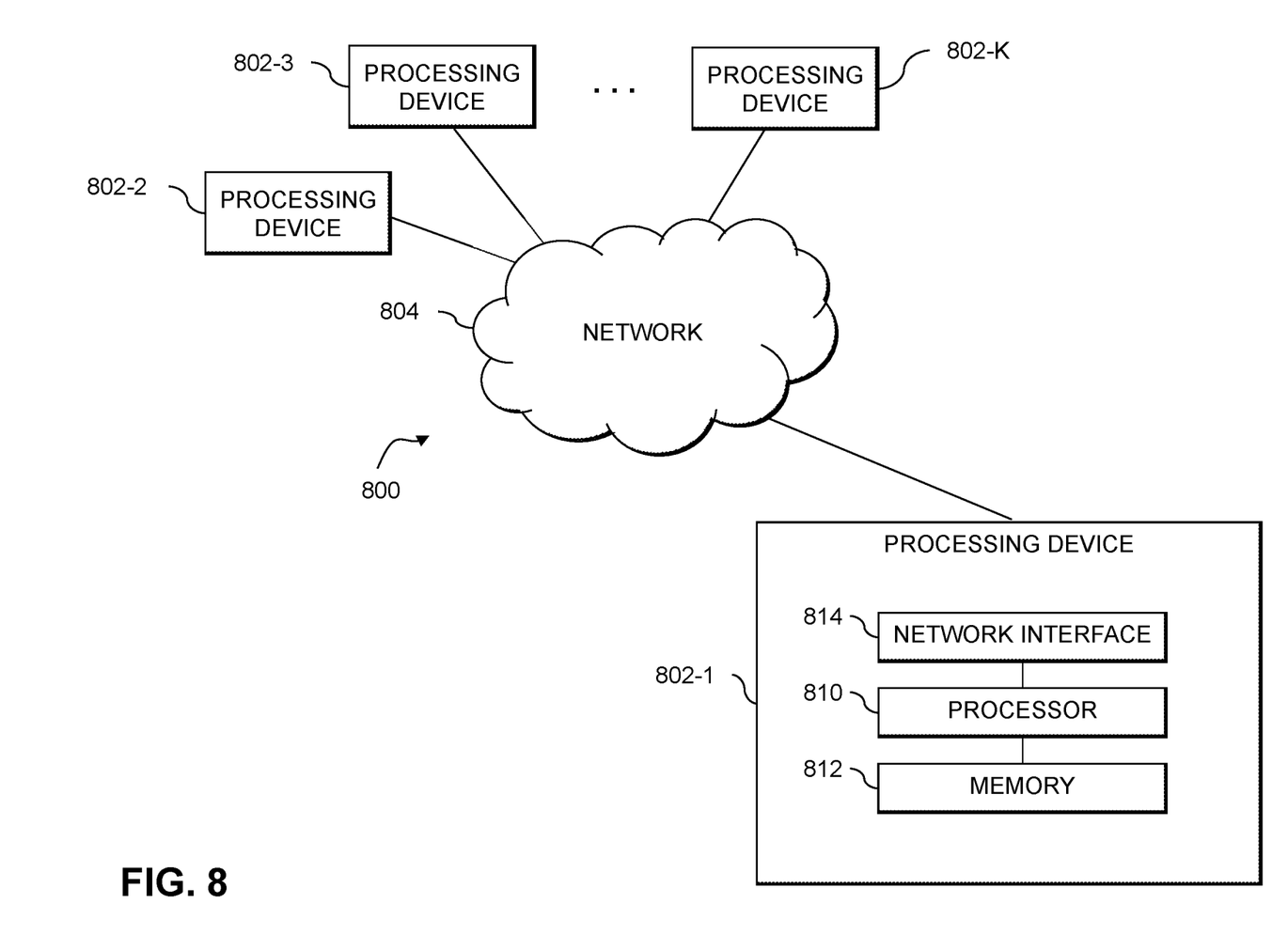

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an ASIC, an FPGA or other type of processing circuitry, as well as portions or combinations of such circuitry elements.

The memory 812 comprises RAM, ROM or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   generating a session identifier for a request associated with executing one or more microservices in a microservice architecture;
   identifying an execution plan for the request based at least in part on a plan identifier specified for a first one of the one or more microservices, wherein the execution plan indicates a specified order for executing the one or more microservices for the request;
   maintaining a set of chained data structures to track an execution order of the one or more microservices based on the session identifier;
   detecting, based at least in part on the set of chained data structures, that the execution order does not match the specified order of the identified execution plan for at least a given one of the of the one or more microservices; and
   in response to the detecting, preventing at least the given one of the one or more microservices from being executed;
   wherein the method is performed by at least one processing device comprising a processor coupled to a memory.

2. The computer-implemented method of claim 1, wherein the execution plan is encrypted with a private key, and wherein the identifying comprises:
   decrypting the execution plan with a public key associated with the one or more microservices.

3. The computer-implemented method of claim 2, wherein the public key and the plan identifier are published to respective auxiliary applications associated with each microservice in the execution plan.

4. The computer-implemented method of claim 3, wherein a given one of the auxiliary applications comprises a sidecar container.

5. The computer-implemented method of claim 3, wherein the session identifier is sent from a first one of the auxiliary applications to a second one of the auxiliary applications in response to receiving a notification that the microservice associated with the first one of the auxiliary applications has completed.

6. The computer-implemented method of claim 1, wherein the execution plan is stored in an immutable data store comprising a plurality of execution plans associated with the microservice architecture.

7. The computer-implemented method of claim 6, wherein the plurality of execution plans is generated, via a user interface, by one or more administrator users.

8. The computer-implemented method of claim 1, wherein the request is received at an application programming interface gateway, wherein the application programming interface gateway performs an authentication process to authenticate a user associated with the request.

9. The computer-implemented method of claim 1, further comprising:
   deleting the set of chained data structures in response to each of the one or more microservices being executed.

10. The computer-implemented method of claim 1, wherein the execution plan further indicates a specified order for one or more components related to at least one of the one or more microservices.

11. A non-transitory processor-readable storage medium having stored therein program code of one or more software programs, wherein the program code when executed by at least one processing device causes the at least one processing device:
   to generate a session identifier for a request associated with executing one or more microservices in a microservice architecture;
   to identify an execution plan for the request based at least in part on a plan identifier specified for a first one of the one or more microservices, wherein the execution plan indicates a specified order for executing the one or more microservices for the request;
   to maintain a set of chained data structures to track an execution order of the one or more microservices based on the session identifier;
   to detect, based at least in part on the set of chained data structures, that the execution order does not match the specified order of the identified execution plan for at least a given one of the of the one or more microservices; and
   in response to the detecting, to prevent at least the given one of the one or more microservices from being executed.

12. The non-transitory processor-readable storage medium of claim 11, wherein the execution plan is encrypted with a private key, and wherein the identifying comprises:
   decrypting the execution plan with a public key associated with the one or more microservices.

13. The non-transitory processor-readable storage medium of claim 12, wherein the public key and the plan identifier are published to respective auxiliary applications associated with each microservice in the execution plan.

14. The non-transitory processor-readable storage medium of claim 13, wherein a given one of the auxiliary applications comprises a sidecar container.

15. The non-transitory processor-readable storage medium of claim 13, wherein the session identifier is sent from a first one of the auxiliary applications to a second one of the auxiliary applications in response to receiving a notification that the microservice associated with the first one of the auxiliary applications has completed.

16. An apparatus comprising:
   at least one processing device comprising a processor coupled to a memory;
   the at least one processing device being configured:
   to generate a session identifier for a request associated with executing one or more microservices in a microservice architecture;
   to identify an execution plan for the request based at least in part on a plan identifier specified for a first one of the one or more microservices, wherein the execution plan indicates a specified order for executing the one or more microservices for the request;
   to maintain a set of chained data structures to track an execution order of the one or more microservices based on the session identifier;
   to detect, based at least in part on the set of chained data structures, that the execution order of the identified execution plan does not match the specified order for at least a given one of the of the one or more microservices; and
   in response to the detecting, to prevent at least the given one of the one or more microservices from being executed.

17. The apparatus of claim 16, wherein the execution plan is encrypted with a private key, and wherein the identifying comprises:
   decrypting the execution plan with a public key associated with the one or more microservices.

18. The apparatus of claim 17, wherein the public key and the plan identifier are published to respective auxiliary applications associated with each microservice in the execution plan.

19. The apparatus of claim 18, wherein a given one of the auxiliary applications comprises a sidecar container.

20. The apparatus of claim 16, wherein the execution plan is stored in an immutable data store comprising a plurality of execution plans associated with the microservice architecture.

* * * * *